(12) United States Patent
Sharifi et al.

(10) Patent No.: US 12,050,110 B2
(45) Date of Patent: Jul. 30, 2024

(54) DETECTING AND IMPROVING SIMULTANEOUS NAVIGATION SESSIONS ON MULTIPLE DEVICES

(71) Applicant: GOOGLE LLC, Mountain View, CA (US)

(72) Inventors: Matthew Sharifi, Mountain View, CA (US); Victor Carbune, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/057,079

(22) PCT Filed: Sep. 11, 2020

(86) PCT No.: PCT/US2020/050353
§ 371 (c)(1),
(2) Date: Nov. 19, 2020

(87) PCT Pub. No.: WO2022/055495
PCT Pub. Date: Mar. 17, 2022

(65) Prior Publication Data
US 2023/0194294 A1  Jun. 22, 2023

(51) Int. Cl.
G01C 21/00 (2006.01)
G01C 21/36 (2006.01)
G10L 15/22 (2006.01)

(52) U.S. Cl.
CPC .......... *G01C 21/3661* (2013.01); *G10L 15/22* (2013.01); *G10L 2015/228* (2013.01)

(58) Field of Classification Search
CPC ................ G01C 21/3661; G10L 15/22; G10L 2015/228
(Continued)

(56) References Cited

U.S. PATENT DOCUMENTS 7,920,968 B2   4/2011   Chapin et al.
8,442,768 B2   5/2013   Sasaki
(Continued)

FOREIGN PATENT DOCUMENTS

EP    2 843 368 A2    3/2015
EP    3 584 538 A1    12/2019
WO    WO-2013/184447 A2   12/2013

OTHER PUBLICATIONS

Tripgeo.com, "Directions Map (with Animated Street View," (2007-2021). Retreived from the Internet at: URL://<http://tripgeo.com/>.
(Continued)

*Primary Examiner* — Tiffany P Young
(74) *Attorney, Agent, or Firm* — MARSHALL, GERSTEIN & BORUN LLP

(57) ABSTRACT

A first computing device can implement a method for providing navigation instructions. The method includes initiating a first navigation session for providing a first set of navigation instructions to a user from a starting location to a destination location along a first route. The method also includes detecting a second computing device in proximity to the first computing device, and determining that the second computing device is implementing a second navigation session for providing a second set of navigation instructions to the destination location along a second route. Further, the method includes adjusting the first navigation session in accordance with the second navigation session.

20 Claims, 9 Drawing Sheets

(58) Field of Classification Search
USPC .......................................................... 701/431
See application file for complete search history.

(56) References Cited

U.S. PATENT DOCUMENTS

| | | |
|---|---|---|
| 8,635,557 B2 | 1/2014 | Geise et al. |
| 8,700,300 B2 | 4/2014 | LeBeau et al. |
| 8,788,203 B2 | 7/2014 | Su et al. |
| 8,792,676 B1 | 7/2014 | Jing et al. |
| 9,135,751 B2 | 9/2015 | Moore et al. |
| 9,377,320 B2 | 6/2016 | Sheridan et al. |
| 9,494,432 B2 | 11/2016 | Pakzad et al. |
| 9,500,492 B2 | 11/2016 | Moore et al. |
| 9,554,241 B2 | 1/2017 | Foster |
| 9,689,698 B2 | 6/2017 | Wesselius et al. |
| 10,462,276 B2 | 10/2019 | Pelly et al. |
| 2014/0362195 A1 | 12/2014 | Ng-Thow-Hing et al. |
| 2015/0192426 A1 | 7/2015 | Foster et al. |
| 2015/0211872 A1* | 7/2015 | Wang ................ G01C 21/3691 |
| | | 701/537 |
| 2015/0233722 A1 | 8/2015 | Faaborg et al. |
| 2016/0003623 A1 | 1/2016 | Venkatraman et al. |
| 2016/0216130 A1* | 7/2016 | Abramson ......... G01C 21/3423 |
| 2017/0215031 A1 | 7/2017 | Harding et al. |

OTHER PUBLICATIONS

International Search Report and Written Opinion for Application No. PCT/US2020/050353, dated Jun. 11, 2021.
International Search Report and Written Opinion for Application No. PCT/US2020/046746, dated Apr. 19, 2021.

\* cited by examiner

DETECTING AND IMPROVING SIMULTANEOUS NAVIGATION SESSIONS ON MULTIPLE DEVICES

FIELD OF THE DISCLOSURE

The present disclosure relates to providing navigation instructions and, more particularly, to detecting and improving simultaneous navigation sessions on multiple devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, many users request navigation directions that guide the user to a desired destination. A variety of software applications capable of executing on computers, smartphones, devices embedded in vehicles, etc. are available that can provide step-by-step navigation instructions. In some scenarios, a single user, or two users in proximity, may request navigation instructions to the same destination via two different devices. For example, a driver and a passenger in a vehicle may each start a navigation session on their respective devices using different software applications. Consequently, the two devices independently provide navigation instructions to the destination. The two devices may provide duplicative instructions. Further, the devices may emit audio instructions simultaneously, which may cause the user(s) to have difficulty hearing the overlapping directions.

SUMMARY

Using the techniques of this disclosure, two devices simultaneously providing navigation instructions to a user can collaborate to enhance the navigation instructions. A first device implementing a first navigation application may provide first navigation instructions to a destination along a route. The first device may detect that a second device in proximity to the first computing device is also providing navigation instructions to the same destination. For example, the first and second devices may be located within the same vehicle. The first device may discover the second device via a first communication link (e.g., WiFi, Bluetooth, ultrasonic signals, etc.). After discovering the second device, the first device can transmit a request (e.g., via the first communication link) for the second device to interoperate with the first device to provide a shared navigation session.

In some implementations, the second device affirmatively responds to the request. The first device and the second device can then interoperate to provide the shared navigation session. For example, the first and second devices may exchange information regarding their respective routes to the destination. The accuracy of the navigation session can therefore be increased. The devices may utilize the first communication link or may setup a second communication link suitable for information exchange. Use of multiple communication links in this manner allows for efficient power, bandwidth and processing for the different types of communication taking place. Further, the devices may designate a primary device to manage the communication exchange and/or to provide audio instructions for the shared navigation session. The devices can create shared navigation instructions based on the exchanged information. In addition to determining a route, the devices can also collaborate to deliver the instructions to the user.

For example, if the routes are identical, then the primary device can emit the audio instructions and display the navigation instructions. The other device can display a notification indicating that the user should follow the instructions of the primary device, and may display navigation instructions unaccompanied by audio instructions. By contrast, if one set of instructions has an earlier estimated arrival time, the devices can select the set with the earlier estimated arrival time to deliver to the user. As a further example, the shared navigation instructions may include some instructions from the first set of instructions and some instructions from the second set of instructions. For instance, a first device may have access to more traffic data regarding a first portion of the route, so the shared navigation instructions may be based on the first device's instructions during the first portion of the route. In such a scenario, the devices may trade-off when they provide audio instructions, with each device emitting the audio instructions based on their respective navigation instructions, or the primary device may emit the audio instructions for the entirety of the trip.

In other implementations, the second device may deny the request to interoperate or may not respond to the request (e.g., because the second device is not capable of interoperating). The first device can attempt to receive a second set of navigation instructions from the second device and can compare the second set of navigation instructions with the first set of instructions. Based on the comparison, the first device can provide instructions that supplement the instructions of the second device.

In particular, an example embodiment of the techniques of the present disclosure is a method in a first computing device for providing navigation instructions, which can be implemented by one or more processors of the first computing device. The method includes initiating a first navigation session for providing a first set of navigation instructions to a user from a starting location to a destination location along a first route. The method also includes detecting a second computing device in proximity to the first computing device, and determining that the second computing device is implementing a second navigation session for providing a second set of navigation instructions to the destination location along a second route. Further, the method includes adjusting the first navigation session in accordance with the second navigation session.

Another embodiment of these techniques is a first computing device for providing navigation instructions. The first computing device includes one or more processors and a non-transitory computer-readable medium storing instructions. When executed by the one or more processors, the instructions cause the first computing device to initiate a first navigation session for providing a first set of navigation instructions to a user from a starting location to a destination location along a first route. The instructions also cause the first computing device to detect a second computing device in proximity to the first computing device, and to determine that the second computing device is implementing a second navigation session for providing a second set of navigation instructions to the destination location along a second route. Further, the instructions cause the first computing device to adjust the first navigation session in accordance with the second navigation session.

Yet another embodiment of these techniques is a method in a first computing device for providing navigation instructions, which can be implemented by one or more processors of the first computing device. The method includes initiating a first navigation session for providing a first set of navigation instructions to a user from a starting location to a destination location along a first route. The method also includes receiving, from a second computing device, a request to interoperate to provide shared navigation instructions in response to the second computing device detecting that the first computing device is implementing the first navigation session. Further, the method includes converting, in response to the request, the first navigation session to a shared navigation session for providing the shared navigation instructions.

DETAILED DESCRIPTION

Overview

Figure 1A:
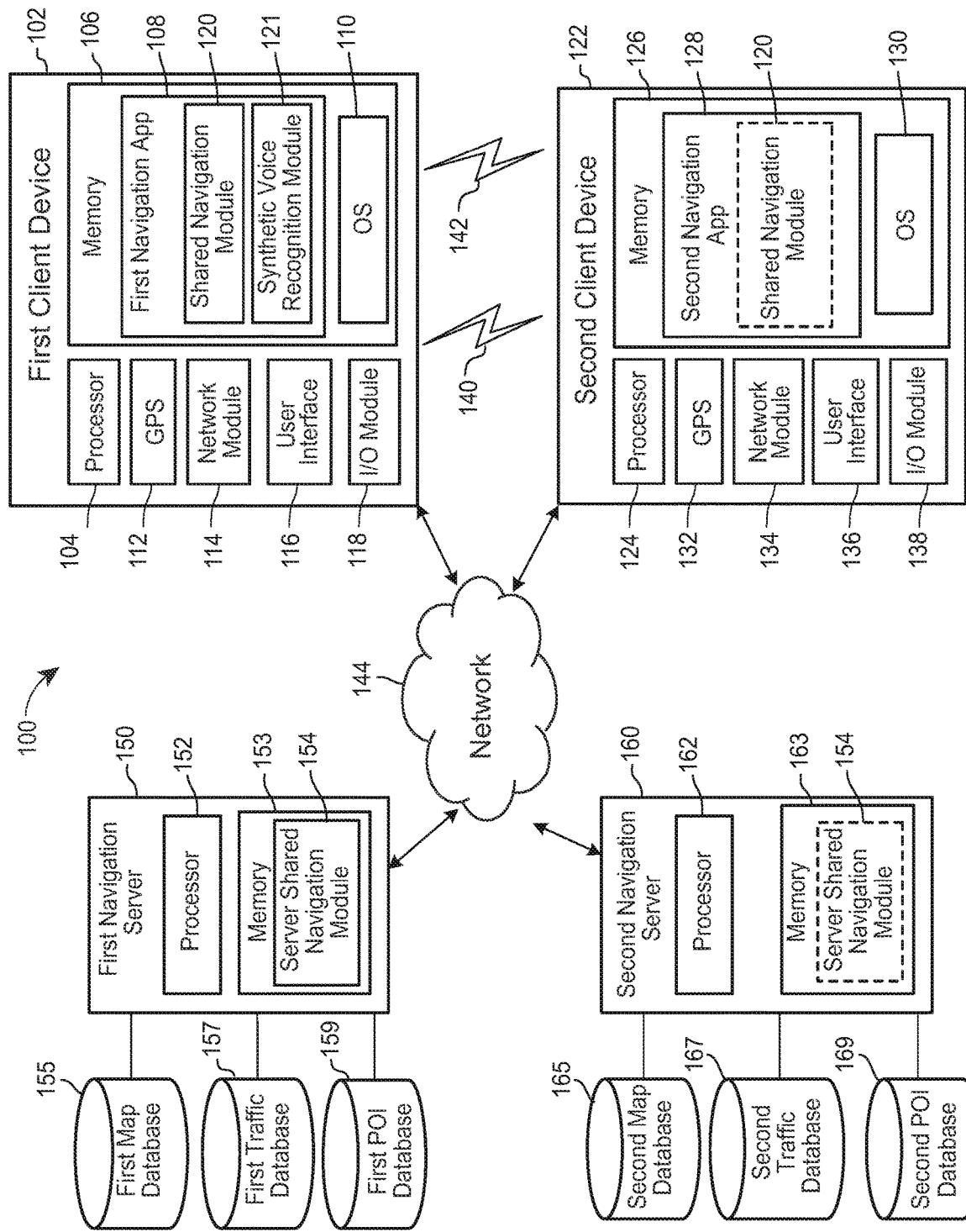
FIG. 1A illustrates a block diagram of an example communication system in which the disclosed techniques for providing navigation instructions can be implemented.

Generally speaking, devices providing simultaneous, individual navigation sessions can utilize the techniques of the present disclosure to cooperatively provide a shared navigation session. The shared navigation session may deliver enhanced navigation instructions and an improved user experience compared to the simultaneous, individual navigation sessions. Using the techniques of this disclosure, a first computing device providing first navigation instructions to a destination can detect that a second computing device in proximity with the first computing device is also providing navigation instructions to the destination. In response, the first computing device can attempt to interoperate with the second computing device. In some scenarios, the first computing device and second computing device can interoperate to collaboratively provide a set of shared navigation instructions to a user. In other scenarios, such as when the second computing device does not respond to a request to interoperate, the first computing device may adjust its navigation session to provide navigation instructions that supplement the navigation instructions of the second computing device. In this way, the overall processing and power use of the first computing device may be reduced. Further, the first computing device can monitor for a synthetic voice, and adjust its navigation session to provide instructions that do not interrupt the synthetic voice.

Aspects of the present disclosure provide a technical solution to the problem of how multiple devices can interact to avoid duplicative navigation instructions and to provide an improved navigation experience for the user. Advantageously, this interoperability of the multiple devices reduces the power and processing of the two devices compared to if they were continuing to operate independently. For example, two devices may, after discovering each other via a first communication link, exchange navigation information via a second communication link with a higher bandwidth. By the first communication link being lower bandwidth than the second communication link enables faster and more efficient discovery of one another. The devices can utilize the exchanged navigation information to generate a route to a destination that takes into account both sets of instructions and/or data (e.g., map data, point of interest data, traffic data, etc.) accessible by each device to optimize the ultimate route presented to the user. Further, the two devices can collaborate with each other such that both devices do not need to present audio instructions at the same time. If a device has a lower battery power or available bandwidth, for example, the other device can be designated as the primary device to present the navigation instructions to the user and/or to fetch data from an external network. In scenarios where a first device detects a synthetic voice generated by another device, the first device can adjust its instructions so as not to speak over the other device.

Example Hardware and Software Components

Referring first to FIG. 1A, an example communication system 100 in which the techniques of this disclosure can be implemented includes a first client device 102 (also referred to herein as a first computing device or as a first device). The first device 102 may be a portable device such as a smart phone or a tablet computer, for example. The first device 102 may also be a laptop computer, a desktop computer, a personal digital assistant (PDA), a wearable device such as a smart watch or smart glasses, etc. In some embodiments, the first device 102 may be removably mounted in a vehicle, embedded into a vehicle, and/or may be capable of interacting with a head unit of a vehicle to provide navigation instructions, as described in more detail with reference to FIG. 1B.

The first device 102 may include one or more processor(s) 104 and a memory 106 storing machine-readable instructions executable on the processor(s) 104. The processor(s) 104 may include one or more general-purpose processors (e.g., CPUs), and/or special-purpose processing units (e.g., graphical processing units (GPUs)). The memory 106 can be a non-transitory memory and can include one or several suitable memory modules, such as random access memory (RAM), read-only memory (ROM), flash memory, other types of persistent memory, etc. The memory 106 may store instructions for implementing a first navigation application 108 that can provide navigation directions (e.g., by displaying directions or emitting audio instructions via the first device 102), display an interactive digital map, request and receive routing data to provide driving, walking, or other navigation directions, provide various geo-located content such as traffic, point-of-interest, and weather information, etc.

Further, the first navigation application 108 may include a shared navigation module 120 configured to implement and/or support the techniques of this disclosure for detecting other navigation sessions executing on devices in proximity with the first device 102, exchanging information with devices to generate shared navigation instructions, configuring the first navigation application 108 to present shared navigation instructions, generating supplemental instructions, etc. The first navigation application 108 may also include a synthetic voice recognition module 121 configured to support the techniques of this disclosure including detecting a simultaneous navigation session by monitoring for audio instructions spoken by a synthetic voice. Such techniques will be discussed in more detail below with reference to FIGS. 2-6.

It is noted that although FIG. 1A illustrates the first navigation application 108 as a standalone application, the functionality of the first navigation application 108 also can be provided in the form of an online service accessible via a web browser executing on the first device 102, as a plug-in or extension for another software application executing on the first device 102, etc. The first navigation application 108 generally can be provided in different versions for different operating systems. For example, the maker of the first device 102 can provide a Software Development Kit (SDK) including the first navigation application 108 for the Android™ platform, another SDK for the iOS™ platform, etc.

The memory 106 may also store an operating system (OS) 110, which can be any type of suitable mobile or general-purpose operating system. The first device 102 may further include a global positioning system (GPS) 112 or another suitable positioning module, a network module 114, a user interface 116 for displaying map data and directions, and input/output (I/O) module 118. The network module 114 may include one or more communication interfaces such as hardware, software, and/or firmware of an interface for enabling communications via a cellular network, a WiFi network, or any other suitable network such as a network 144, discussed below. The I/O module 118 may include I/O devices capable of receiving inputs from, and presenting outputs to, the ambient environment and/or a user. The I/O module 118 may include a touch screen, display, keyboard, mouse, buttons, keys, microphone, speaker, etc. In various implementations, the first device 102 can include fewer components than illustrated in FIG. 1A or, conversely, additional components.

The communication system 100 also includes a second client device 122 (also referred to herein as a second computing device or a second device). The second device 122 may be generally similar to the first device 102. In particular, second device 122 may include one or more processor(s) 124, a memory 126, a GPS 132, a network module 134, a user interface 136, and an I/O module 138, which may be similar to the processor(s) 104, memory 106, GPS 112, network module 114, user interface 116, and I/O module 118, respectively. The second device 122 may be manufactured by a different maker than the first device 102. For example, a maker of the first device 102 may be Google™, and a maker of the second device 102 may be Apple™. Similarly, an OS 130 stored by the memory 126 may be different from the OS 110. It should be noted that while FIG. 1A depicts two client devices, the first device 102 and the second device 122, the techniques of this disclosure can be applied in scenarios with two or more client devices.

The memory 126 also stores a second navigation application 128. The second navigation application 128, for example, may be a different navigation application from the first navigation application 108, or may be the same as the first navigation application 108. For instance, the second navigation application 108 may be similar to the first navigation application 108, but configured for the OS 130. Further, the second navigation application 128 may, or may not, store a shared navigation module 120 similar to the shared navigation module 120. As discussed below, different techniques of this disclosure may be appropriate depending on whether the second device 122 implements the shared navigation module 120.

The first device 102 and the second device 122 may establish communication via a variety of communication links, such as communication links 140 and 142. The first and second devices 102, 122, for example, may discover each other via the first communication link 140. The first communication link 140 may be any communication link suitable for short-range communications and may conform to a communication protocol such as, for example, Bluetooth™ (e.g., BLE), Wi-Fi (e.g., Wi-Fi Direct), NFC, ultrasonic signals, etc. In some scenarios, the first communication link 140 may include a wired connection. In addition to discovering each other, the first and second devices 102 may exchange information via the first communication link 140. In some scenarios, after using the first communication link 140, the first and second devices 102, 122 may establish the second communication link 142 to exchange information. The second device 122, for example, may receive information needed to establish the second communication link 142 from the first device 102 via the first communication link 140, and the first device 102 may receive similar information from the second device 122. The second communication link 142 may be, for example, WiFi, a cellular communication link (e.g., conforming to 3G, 4G, or 5G standards), etc. Compared to the first communication link 140, the second communication link 142 may have a higher bandwidth, higher throughput, reduced latency, etc. Accordingly, the second communication link 142 may be more suitable for exchanging content such as map data and navigation directions, and the first communication link 140 may be more suitable for use as a low-power discovery mechanism.

The first device 102 and the second device 102, respectively, may communicate with a first navigation server 150 and a second navigation server 160 via a network 144. The network 144 may include one or more of an Ethernet-based network, a private network, a cellular network, a local area network (LAN), and/or a wide area network (WAN), such as the Internet. In some scenarios, the second communication link 142 may be a communication link over the network 144. The first navigation application 108 may receive map data, navigation directions, and other geo-located content from the first navigation server 150. Likewise, the second navigation application 128 may receive similar information from the second navigation server 160. In some scenarios, for example, if the first navigation application 108 and the second navigation application 128 are applications from the same software developer, the first and second devices 102, 122 may communicate with the same navigation server, such as the first navigation server 150, and the second device 122 may not communicate with the second navigation server 160. Further, the first navigation application 108 may access map, navigation, and geo-located content that is stored locally at the first device 102, and may access the first navigation server 150 periodically to update the local data or during navigation to access real-time information, such as real-time traffic data. Similar considerations apply to the second navigation application 128.

The first navigation server 150 includes one or more processor(s) 152 and a memory 153 storing computer-readable instructions executable by the processor(s) 152. The memory 153 may store a server shared navigation module 154. The server shared navigation module 154 may support similar functionalities as the shared navigation module 120 from the server-side and may facilitate coordination of the first device 102 and the second device 122. For example, the first device 102 may provide the first navigation server 150 with navigation information received from the second device 122 and request that the server shared navigation module 154 generate a shared set of navigation instructions.

The server shared navigation module 154 and the shared navigation module 120 can operate as components of a shared navigation system. Alternatively, the entire functionality of the server shared navigation module 154 can be implemented in the shared navigation module 120.

The first navigation server 150 may be communicatively coupled to various databases, such as a first map database 155, a first traffic database 157, and a first point-of-interest (POI) database 159, from which the first navigation server 150 can retrieve navigation-related data. The first map database 155 may include map data such as map tiles, visual maps, road geometry data, road type data, speed limit data, etc. The first traffic database 157 may store historical traffic information as well as real-time traffic information. The first POI database 159 may store descriptions, locations, images, and other information regarding landmarks or points-of-interest. While FIG. 1A depicts databases 155, 157, and 159, the first navigation server 150 may be communicatively coupled to additional, or conversely, fewer, databases. For example, the first navigation server 150 may be communicatively coupled to a database storing weather data.

The second navigation server 160 may be generally similar to the first navigation server 150, and may include one or more processor(s) 162 and a memory 163. Depending on the scenario, the memory 163 may also store a server shared navigation module 154, similar to the memory 153. The second navigation server 160 may be communicatively coupled to databases such as a second map database 165, a second traffic database 167, and a second POI database 169. The databases 165, 167, and 169 may store different data than the databases 155, 157, and 159. For example, the second traffic database 167 may receive traffic data from a different source than the first traffic database 157.

Figure 1B:
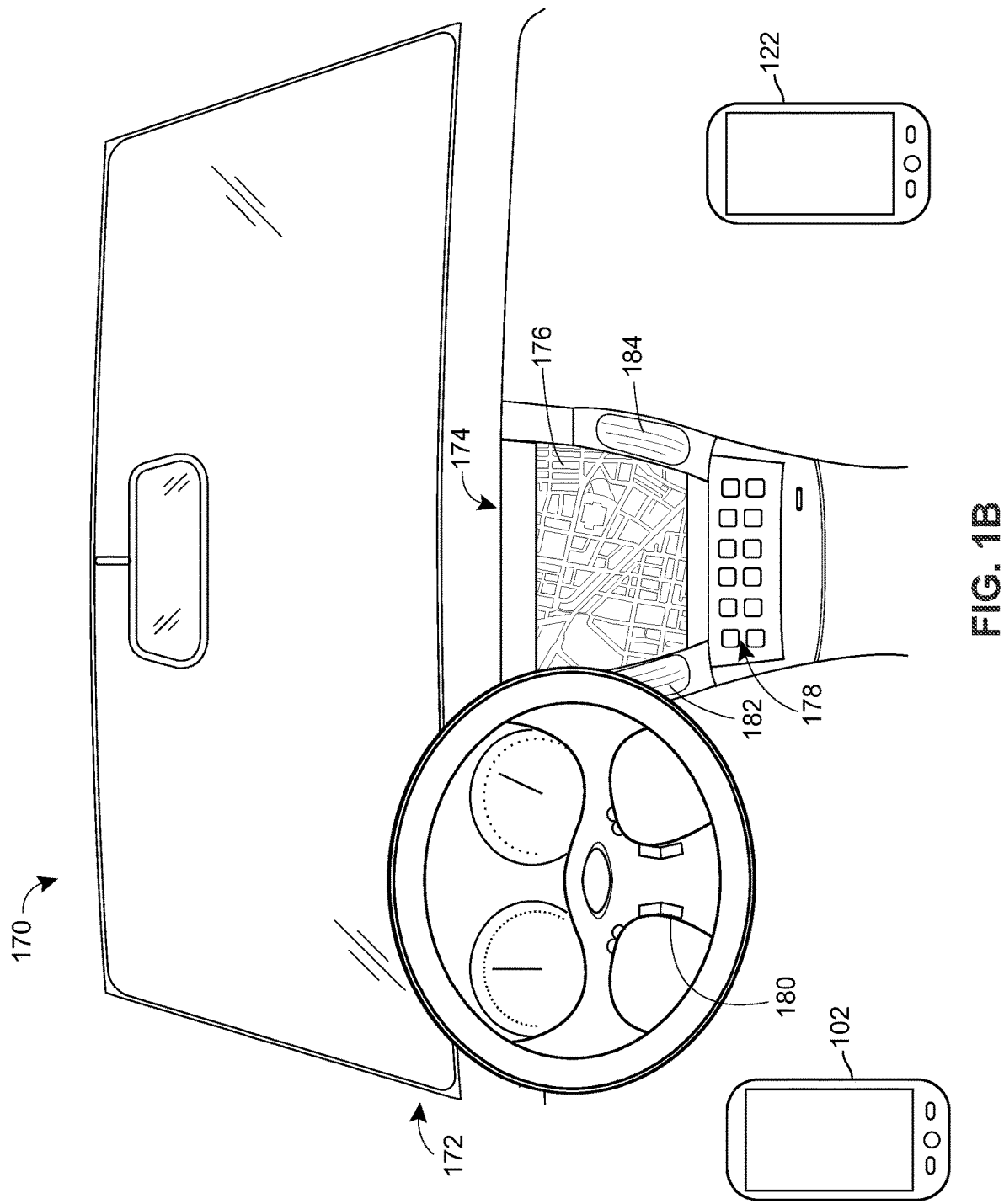
FIG. 1B illustrates an example vehicle environment in which the techniques for providing navigation instructions can be implemented.

Turning to FIG. 1B, the first device 102 and the second device 122 may interact in a vehicle environment 170. The first device 102 and the second device 122 may both be located within a vehicle 172. While FIG. 1B depicts the first and second devices 102 and 122 as smartphones, this is for ease of illustration only. The first and second devices 102 and 122 may be different types of devices, and may include any suitable type of portable or non-portable computing devices. The vehicle 172 may include a head unit 174. In some implementations, the head unit 174 may include one of the first or the second devices 102 or 122. Even if the head unit 174 does not include the first device 102 or the second device 122, the first device 102 or the second device 122 may communicate (e.g., via a wireless or wired connection) with the head unit 174. The first device 102 or the second device 122 may transmit navigation information such as maps or audio instructions to the head unit 174 for the head unit 174 to display or emit, and a user may interact with the first device 102 or the second device 122 by interacting with head unit controls. In addition, the vehicle 172 may provide one or more of the communication links 140 and 142. For example, the first communication link 140 may include a wired connection to the vehicle 172 (e.g., via a USB connection).

Accordingly, the head unit 174 may include a display 176 for presenting navigation information such as a digital map. The display 176 in some implementations includes a software keyboard for entering text input, which may include the name or address of a destination, point of origin, etc. Hardware input controls 178 and 180 on the head unit 174 and the steering wheel, respectively, can be used for entering alphanumeric characters or to perform other functions for requesting navigation directions. The head unit 174 also can include audio input and output components such as a microphone 182 and speakers 184, for example. As an example, the second device 122 may communicatively connect to the head unit 174 (e.g., via Bluetooth™, WiFi, cellular communication protocol, wired connection, etc.) or may be included in the head unit 174. The second device 122 may present map information via the display 176 of the head unit 174, emit audio instructions for navigation via the speakers 184, and receive inputs from a user via the head unit 174 (e.g., via a user interacting with the input controls 178 and 180, the display 176, or the microphone 182).

Example Navigation Displays During Scenarios Involving Simultaneous Navigation Sessions The techniques of this disclosure for providing navigation directions are discussed below with reference to navigation displays illustrated in FIGS. 2-6. Throughout the description of FIGS. 2-6, actions described as being performed by the first device 102 may, in some implementations, be performed by the second device 122 or may be performed by the first and second devices 102, 122 in parallel. For example, either the first or the second device 102, 122 may detect the other device is in proximity and implementing a navigation session, either the first or the second device 102, 122 may act as the primary device or select which device will act as the primary device, and/or either the first or the second device 102, 122 may determine shared navigation instructions for a joint route to the destination or direct the other device to play audio instructions.

Figure 2:
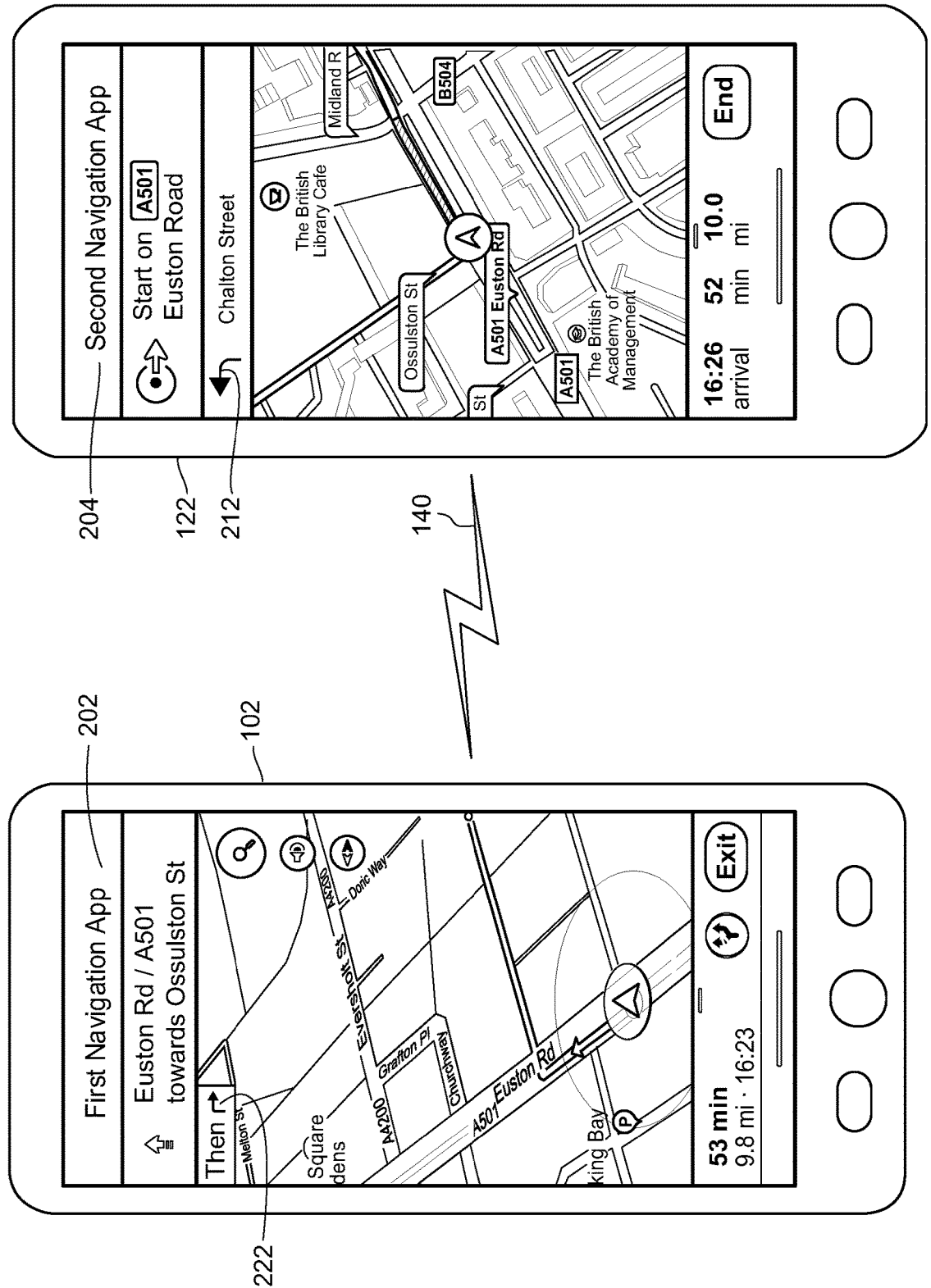
FIG. 2 illustrates example navigation displays of a first computing device and a second computing device, respectively, which may attempt to form a communicative connection via a first communication link.

Referring to FIG. 2, the first device 102 may implement the first navigation application 108 and display a graphical user interface (GUI) 202 of the first navigation application 108. Similarly, the second device 122 may implement the second navigation application 122 and display a GUI 204 of the second navigation application. The two devices 102, 122 simultaneously implement navigation sessions in proximity with each other. For example, the two devices 102, 122 may both be located in the same vehicle 172.

More particularly, the first device 102 initiates a first navigation session for providing a first set of navigation instructions from a starting location to a destination location (e.g., in response to a request received at the first device 102 from a user interacting with the first device 102). The first set of navigation instructions may include step-by-step directions for reaching the destination location along a first route. During the first navigation session, the first device 102 may display, via the GUI 202, a map depicting a location of the first device 102, a heading of the first device 102, an estimated time of arrival, an estimated distance to the destination, an estimated time to the destination, a current navigation direction, one or more upcoming navigation directions of the first set of navigation instructions, one or more user-selectable options for changing the display or adjusting the navigation directions, etc. The first device 102 may also emit audio instructions corresponding to the first set of navigation instructions.

The second device 122 also initiates a second navigation session for providing a second set of navigation instructions from a starting location to a destination location along a second route. The second route may be different than the first route. For example, while the second navigation application 128 indicates that an upcoming maneuver 212 is a left turn, the first navigation application 208 indicates that an upcoming maneuver 222 is a right turn. The second device 122 may be operated by the same user as the first device 102, or by another user in proximity with the first device 102. For instance, a user may initiate the first navigation session on the first device 102 and the second navigation session on the second device 122 (e.g., because the first navigation application 108 has access to higher quality map data (e.g., a higher amount of map data or more detailed map data) for a region the user is traveling in, but the second navigation application 128 has access to higher quality traffic data). In an example scenario, a user may initiate the first navigation session on the first device 102 corresponding to the user's smartphone, and initiate the second navigation session on the second device 122 corresponding to a head unit (e.g., the head unit 174), or another device communicatively coupled to the head unit, of a vehicle the user is traveling in. In another example scenario, a driver of a vehicle may initiate the first navigation session on the first device 102 corresponding to the driver's smartphone, and a passenger may initiate the second navigation session on the second device 122 corresponding to the passenger's smartphone.

In any event, the first device 102 may detect whether another device in proximity to the first device 102 is implementing a navigation session. In some scenarios, the first device 102 may only attempt to discover other navigation sessions if an interoperability feature of the first navigation application 108 is triggered. The first navigation application 108 may trigger the interoperability feature if the first navigation application 108 detects that the first device 102 is within a car or other vehicle that holds a small number of passengers (e.g., approximately one to five passengers). If the first navigation application 108 detects that the first device 102 is within a larger vehicle, such as a bus transporting commuters or other public transportation vehicle, then the first navigation application 108 may not trigger the interoperability feature. Additionally or alternatively, the interoperability feature may be manually triggered by the user, or may be triggered as a default option. To determine the type of vehicle, the first device 102 may, for example, query a vehicle head unit, receive a broadcast from a vehicle head unit, or determine whether the route is a public transport route. In still further examples, the first navigation application 108 may trigger the interoperability feature if the first navigation application 108 detects that the first device 102 is within a vehicle that includes a navigation unit, or detects that the first device 102 is in proximity to a WiFi hotspot. Still further, the first navigation application 108 may trigger the interoperability feature based on the route or on the current GPS location of the first device 102.

The first device 102 may detect whether another device in proximity to the first device is implementing a navigation session in a variety of ways. In some implementations, such as the implementation depicted in FIG. 2, the first device 102 can detect that the second device 122 is implementing the second navigation session by receiving an indication in a broadcast, over the first communication link 140, by the second device 122. For example, the second device 122 may broadcast that the second device 122 is currently implementing a navigation session. The first device 102 may similarly broadcast to the second device 122 that the first device 102 is implementing a navigation session, such that each device may be capable of discovering the other over the first communication link 140.

As a more particular example, the second device 122 can broadcast a discoverable message in accordance with a protocol such as Bluetooth™. The second device 122 may encode the message with an identity of the second device 122 and the message may include an indication that the second device is implementing a navigation session. The first device 102 can monitor for discoverable devices on frequencies associated with the protocol. After detecting the second device 122, the first device 102 may provide an identity of the first device 102 to the second device 122 and attempt to pair with the second device 122. To complete the pairing, the first device 102 and the second device 122 may exchange security keys.

Additionally or alternatively, the first device 102 may detect the second device 122, and determine that the second device 122 is implementing the second navigation session, based on ambient noise detected by the first device 102. For example, in some cases the first device 102 can detect the second device 122 by detecting ambient noise instead of detecting the first device 102 over the first communication link 140. The first device 102 can detect the second device 122 by monitoring for a synthetic voice (e.g., a voice generated by a navigation application) played back in proximity to the first device 102 (e.g., within the same vehicle 172) using the synthetic voice recognition module 121. The synthetic voice recognition module 121 may monitor ambient noise to detect acoustic characteristics of the ambient noise, such as frequency, pitch, rate at which noises are generated, etc., and compare detected acoustic characteristics to known characteristics of a synthetic voice. Further, the synthetic voice recognition module 121 may employ a machine learning algorithm, heuristic algorithm, or other algorithm to determine whether ambient noise detected by the first device 102 includes a synthetic voice. Based on detecting the synthetic voice, the first device 102 can determine that the second device 122 is nearby.

After detecting the synthetic voice, the first device 102 can separate the synthetic voice from the ambient noise and analyze the speech of the synthetic voice. The first device 102 may employ a machine learning algorithm, heuristic algorithm, or other algorithm (which may be part of the synthetic voice recognition module 121 or the first navigation application 108) to analyze the speech of the synthetic voice. The first device 102 can determine, based on words, phrases, speech patterns, etc. of the synthetic voice, that the synthetic voice is reciting navigation directions associated with a second navigation session. For example, the first device 102 can detect that the synthetic voice is reciting instructions such as "turn left," or "continue straight."

In some implementations, the first device 102 may first determine that the second device 122 is in proximity to the first device 102 (e.g., by receiving an identifier or other indication of the second device 122 via the first communication link 140), and then may determine whether the detected second device 122 is implementing a navigation session.

In addition to detecting that the second device 122 is implementing the second navigation session, the first device 102 may detect that the second device 122 is implementing the second navigation session for providing a second set of navigation instructions to the same destination as the first navigation session. For example, the second device 122 may broadcast via the first communication link 140 that the second device 122 is currently implementing a navigation session, and that the destination is a particular location. As another example, after discovering each other via the first communication link 140, the first device 102 and/or the second device 122 may send an indication of the destination of the respective navigation session to the other device (e.g., in response to a request from the other device or automatically upon discovering the other device).

After detecting the second device 122 and determining that the second device 122 is implementing a navigation session, the first device 102 may attempt to interoperate with the second device 122 to implement a shared navigation session for providing shared navigation instructions to the user(s). The method in which the first device 102 and the second device 122 coordinate may vary depending on the capabilities of the second device 122. In some scenarios, the first device 102 (or, vice versa, the second device 122) may send a request to the other device (i.e., the second device 122) via the first communication link 140 to request to interoperate. If the second device 122 responds affirmatively, then each device 102 and 122 can adjust their respective navigation sessions by converting the navigation sessions to a shared navigation session, in the manner described with reference to FIGS. 3-4. If the second device 122 denies the request or does not acknowledge the request (e.g., because the second device 122 does not include the shared navigation module 120), the first device 102 may still adjust the first navigation session (e.g., by providing supplementary instructions to the second set of navigation instructions) to unify the user experience, as described with reference to FIGS. 5-6.

Further, some scenarios may not require an explicit request to interoperate. If the first navigation application 108 and the second navigation application 128 both include the shared navigation module 120, then the first navigation application 120 and the second navigation application 128 may automatically enter a parallel navigation mode to provide shared navigation instructions in response to determining that the first device 102 and/or the second device 122 are implementing navigation sessions for navigating to the same destination. The first navigation application 108 and/or the second navigation application 128 may prompt their respective users for confirmation, or to otherwise indicate that the navigation applications 108, 128 have entered a parallel navigation mode. The first device 102 and second device 122 may then proceed as described with reference to FIGS. 3-4. If the second navigation application 128 does not include the shared navigation module 120, the first navigation application 108 may detect this based on information received from the second device 122 and may automatically enter a supplementary navigation mode (or may prompt the user for confirmation) and may indicate to the user that the first navigation application 108 has entered a supplementary navigation mode. The first device 102 may then proceed as described with reference to FIGS. 5-6.

Figure 3:
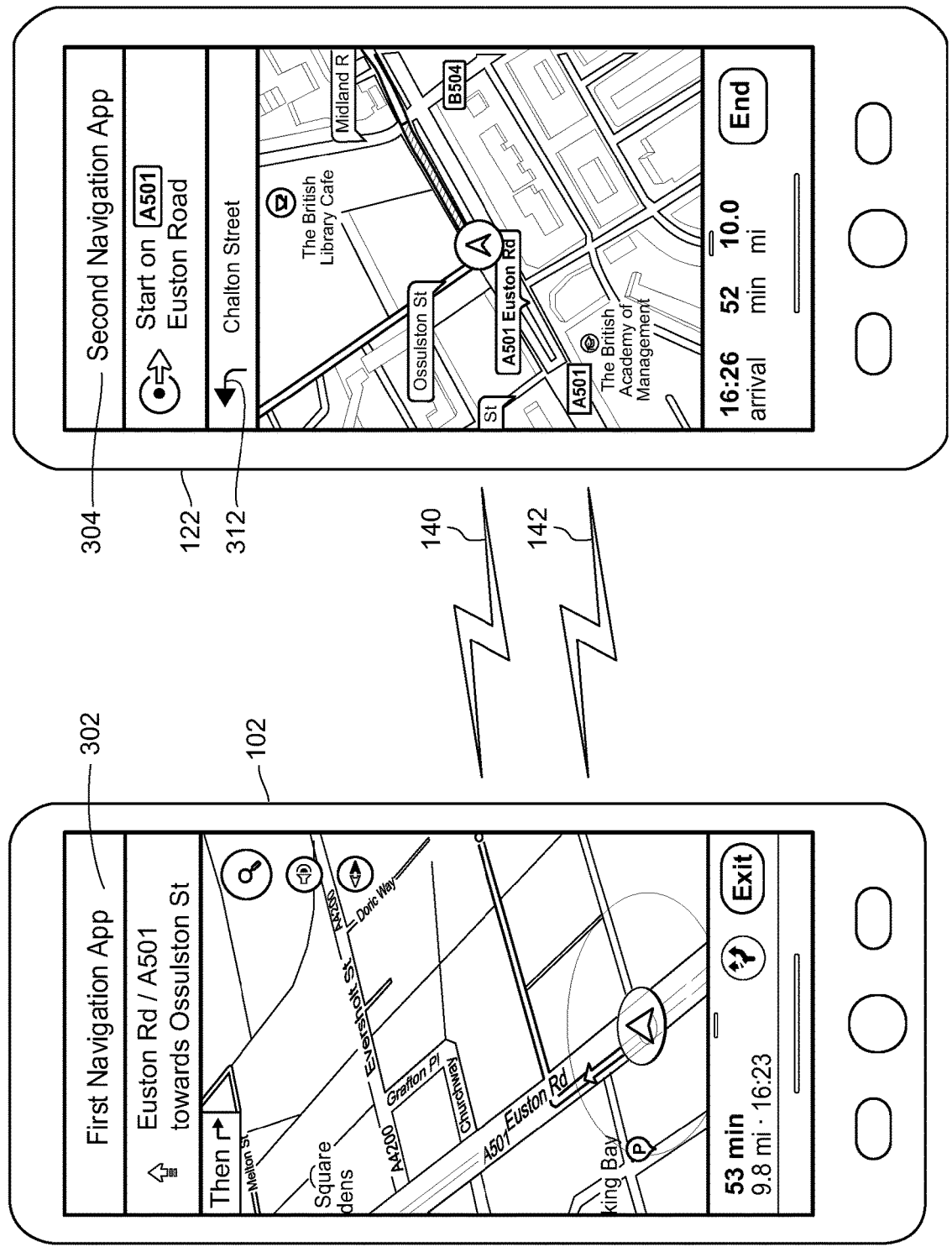
FIG. 3 illustrates example navigation displays of the first computing device and the second computing device exchanging information via a second communication link after forming a connection via the first communication link illustrated in FIG. 2.
Figure 4:
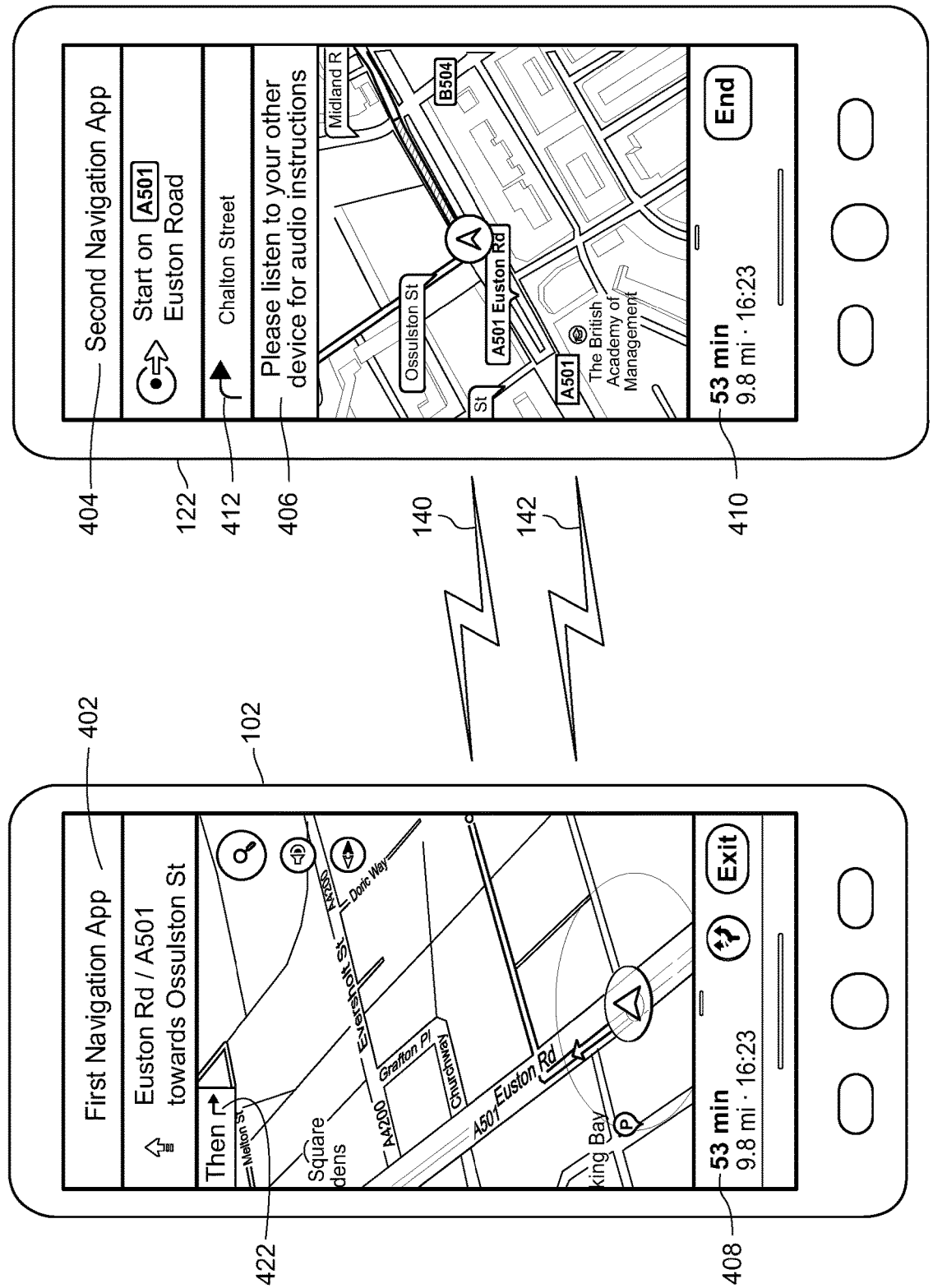
FIG. 4 illustrates example navigation displays of the first computing device and the second computing device while the first and second computing devices are interoperating to provide a shared navigation session.

Turning to FIGS. 3-4, these figures illustrate example navigation displays while the first device 102 and the second device 122 are interoperating to provide a shared set of navigation instructions to the user(s). More particularly, the first navigation application 108 and the second navigation application 128 may be operating in a parallel navigation mode. In the interoperating scenarios of FIGS. 3-4, each of the first device 102 and the second device 122 convert their respective navigation session to a shared navigation session. For the shared navigation session, the first device 102 and the second device 122 determine a shared set of navigation instructions (also referred to herein as "shared navigation instructions") and determine a manner in which to provide the shared navigation instructions to the user(s).

Referring to FIG. 3, initially, the first device and the second device 122 may display GUIs 302 and 304, respectively, which may be similar to the GUIs 202 and 204. The GUIs 302 and 304 may include notifications to the user(s) of the first and the second devices 102, 122 to indicate that the devices 102, 122 are entering, operating, or currently preparing to interoperate to provide a shared navigation session.

The first device 102 and second device 122 may exchange information to initiate the second communication link 142. Over the first communication link 140, the first device 102 and second device 122 may negotiate to select and open the new second communication link 142 for the purpose of exchanging route information. As mentioned previously, the second communication link 142 may have a higher bandwidth than the first communication link 140 and may therefore be more suitable for exchanging route information such as navigation instructions, traffic data, POI data, weather data, etc. The first navigation application 108 and/or the second navigation application 128 may include selection criteria for determining a suitable second communication link 142. The selection criteria may include factors such as bandwidth, throughput, latency, predicted link bandwidth along the first or second routes, capabilities of the first and second devices, hardware such as antennas of the first and second devices, etc. Hence, this selection process can result in a reduction in bandwidth, increase in speed and improved operability.

After initiating the second communication link 142, the first device 102 and the second device 122 may exchange information relevant to initiating the shared navigation session, such as information regarding the devices' respective routes and information regarding the devices' capabilities, via the second communication link 142. However, it should be noted that while the examples of this disclosure primarily refer to information being exchanged via the second communication link 142, in some scenarios, the first device 102 and the second device 122 may not initiate or communicate over the second communication link 142. In such scenarios, all communications between the first device 102 and the second device 122, or at least a portion of the communications including exchanges of route information, may be over the first communication link 140.

In any event, the first device 102 and the second device 122 may exchange information such as route information relevant to their respective routes. The first device 102 may receive route information from the second device 102 and use the route information to confirm that the destinations of the first and the second set of navigation instructions are the same (or similar within a tolerance, such as within 0.1 miles of each other). The first device 102 may receive second route information regarding the second route from the second device 122. The first device 102 may also transmit first route information regarding the first route to the second device 122, and/or may collect the first and the second route information at the first device 102. First route information regarding the first route may include, for example, the first set of navigation instructions, map data, traffic data, POI data, weather data, etc. accessible by the first navigation application 108, etc. Likewise, second route information regarding the second route may include the second set of navigation instructions, map data, traffic data, weather data, etc. accessible by the second navigation application 128, etc.

Based on the first route information and the second route information, the first device 102, the second device 122, or the first device 102 and the second device 122 in combination can determine shared navigation instructions for a joint route to the destination. In some implementations, the first device 102 can transmit the first and second route information to the first navigation server 150, and the first navigation server 150 may generate the shared navigation instructions and transmit the shared navigation instructions to the first device 102. The first device 102 and the second device 122 can collectively determine how to allocate and distribute the processing functions required to generate the shared navigation instructions. For example, the first device 102 alone may generate the shared navigation instructions and transmit the shared navigation instructions to the second device 122 (and vice versa). As another example, the first device 102 and the second device 122 may each generate instructions for a portion of the joint route. Such shared processing between the devices can therefore optimize processing resource thereby providing at least improved power consumption and faster processing speed.

In particular, the first device 102 and the second device 122 may select one of the devices to be a primary device. The primary device can coordinate generation of the shared navigation instructions and determination of the manner in which the first and the second devices 102, 122 can provide the shared navigation instructions to the user(s). In some scenarios, the primary device may analyze the first and the second route information, generate a shared set of navigation directions, and determine a manner in which the devices 102, 122 are to deliver the shared set of navigation directions to the user. In other scenarios, the primary device may delegate some or all of these functions to the other device. In further scenarios, the first device 102 and second device 122 may perform some or all of these functions in combination. Which device is selected as the primary device and/or which device performs each function may depend on a set of selection criteria of the shared navigation module 120. The selection criteria may be based on factors such as the relative battery state, charging state, location (e.g., in the case of a vehicle environment, which device is closer to a driver of the vehicle), bandwidth, signal strength, processing capability, display capability, speaker quality, etc. of the two devices 102, 122. For example, the first and second devices 102, 122 may designate the first device 102 as the primary device because the first device 102 has a stronger connection to the network 144. As the primary device, the first device 102 may delegate particular tasks to the second device 122 based on the capabilities of the second device 122. For instance, if the second device 122 has higher quality speakers, or is configured to emit audio via the vehicle speakers 184, then the primary device may designate the second device 122 as the device to emit audio instructions corresponding to the shared navigation instructions.

For ease of explanation only, the discussion of FIGS. 3-4 refers to the first device 102 as the primary device that coordinates generating and presenting the shared navigation instructions. While the discussion of FIGS. 3-4 refers to the first device 102 as performing certain tasks, such as selecting a particular navigation instruction, as the primary device the first device 102 can delegate the tasks to the second device 122, or can collaborate with the second device 122 to perform the tasks.

The shared navigation directions may be generated in a variety of ways. Generally speaking, the first device 102 determines the shared navigation directions that will best optimize the route for the user. In a first example, if the first set of navigation instructions and the second set of instructions are identical, then the first device 102 can select the first set of navigation instructions as the shared navigation instructions. In a second example, the first device 102 can select either the first or the second set of navigation instructions as the shared navigation instructions depending on which set of instructions has an earlier estimated time of arrival, has fewer maneuvers, has a shorter distance, requires less tolls, encounters less traffic, passes more points of interest, etc. The first navigation application 108 can include user-selectable options for selecting user preferences regarding the shared navigation instructions. The first device 102 can take into account user preferences (e.g., avoid freeways, avoid narrow roads, avoid tolls, etc.), as stored at the first device 102 or received from the second device 122, to select instructions. In a third example, the shared navigation instructions can be a combination of instructions from both the first and the second set of instructions. To form the shared navigation instructions, the first device 102 can, for each segment of a route, select an individual instruction from either the first set of navigation instructions or the second set of navigation instructions. The first device 102 can select the individual instruction based on characteristics of the first and second sets of navigation instructions. For instance, the first device 102 may select a particular instruction from the first set of instructions for a particular route segment because the first route information includes a higher amount of navigation data, traffic data, map data, etc. for the particular route segment.

Further, the shared navigation instructions can include individual instructions that are not in the first set of instructions or the second set of instructions, but that are generated based on the first and the second route information. For example, by combining the first and the second route information, the first device 102 may determine a new route to the destination. Because the new route is based on a wider variety of information, the new route may be improved over the first and the second route (e.g., have an earlier estimated time of arrival).

In addition to shared navigation instructions including turn-by-turn navigation directions to the route, the first device 102 can generate shared route information based on the first and the second route information. For example, even if a particular instruction from the first set of navigation instructions is selected for the turn-by-turn navigation instructions, the shared route information may include information from the second route information, such as traffic information, POI information, or digital maps. The first and the second devices 102, and 122 can present the shared route information to the user(s) to provide context for the turn-by-turn directions.

In addition to determining the shared navigation instructions, the first device 102, as the primary device, also determines a manner in which to provide the shared navigation instructions to the user. The manner in which the shared navigation instructions are to be provided includes how the shared navigation instructions will be displayed to the user and how any accompanying audio instructions will be delivered to the user (e.g., by which device). Which device presents the instructions can depend on the capabilities of the devices, and on the instructions themselves. For example, if the first set of navigation instructions are selected as the shared navigation instructions, then the first device 102 may display the shared navigation instructions and emit the corresponding audio instructions. If the shared navigation instructions include instructions based on both the first and second route information, then the first device 102 may provide audio instructions for instructions of the shared navigation instructions determined based on the first route information, and the second device 122 may provide audio instructions for instructions of the shared navigation instructions determined based on the second route information. In some cases, the primary device may display the shared navigation directions and emit corresponding audio instructions. The device that is not selected to emit audio instructions can still display the shared navigation directions, as described below with reference to FIG. 4. In still further cases, the primary device may display the shared navigation directions and emit turn-by-turn navigation directions, and the other device can emit other route information, such as traffic or POI information. By selecting a coherent manner in which to present the instructions, the first and second devices 102, 122 can avoid talking over or interrupting each other.

Furthermore, while the shared navigation session is in progress, the first device 102 and/or second device 122 may continue to collect information from the first navigation server 150, the second navigation server 160, and/or other sources via the network 144 to update the route. The primary device can exclusively collect new information, or can delegate the download task to the other device. For example, if the primary device has a better connection to the network 144, has a better battery life, or has a lower cost data plan than the other device, then the primary device can exclusively collect new information. By only one device collecting new information there is a reduction in bandwidth and processing requirements across the first and second devices. As another example, the first device 102 may collect map data from the first navigation server 150, and the second device 122 may collect traffic data from the second navigation server 160. Thus, the devices 102, 122 can distribute the downloading tasks in a way that maximizes the speed of downloads and/or the efficiency of the devices 102, 122.

FIG. 4 illustrates example GUIs 402 and 404 of the first navigation application 108 and the second navigation application 128 in an example scenario where the first device 102 and the second device 122 are interoperating to provide a shared navigation session. In the example scenario, the first device 102 displays turn-by-turn navigation instructions of the shared navigation instructions and emits corresponding audio instructions. The second device 122 also displays the shared navigation instructions, but does not emit the corresponding audio instructions. The second navigation application 128 may display a prompt 406 to indicate that the other device is providing audio instructions (e.g., "Please listen to your other device for audio instructions."). Because the second navigation application 128 displays the shared navigation instructions rather than the original second set of navigation instructions, the second navigation application 128 displays an upcoming maneuver 412, which is a right turn rather than the left turn upcoming maneuver 212. The first navigation application 128 displays a matching upcoming maneuver 422. Further, the first navigation application 128 displays predicted route information 408, including an estimated time duration to arrival, estimated time of arrival, and distance to destination. The second navigation application displays matching predicted route information 410.

Figure 5:
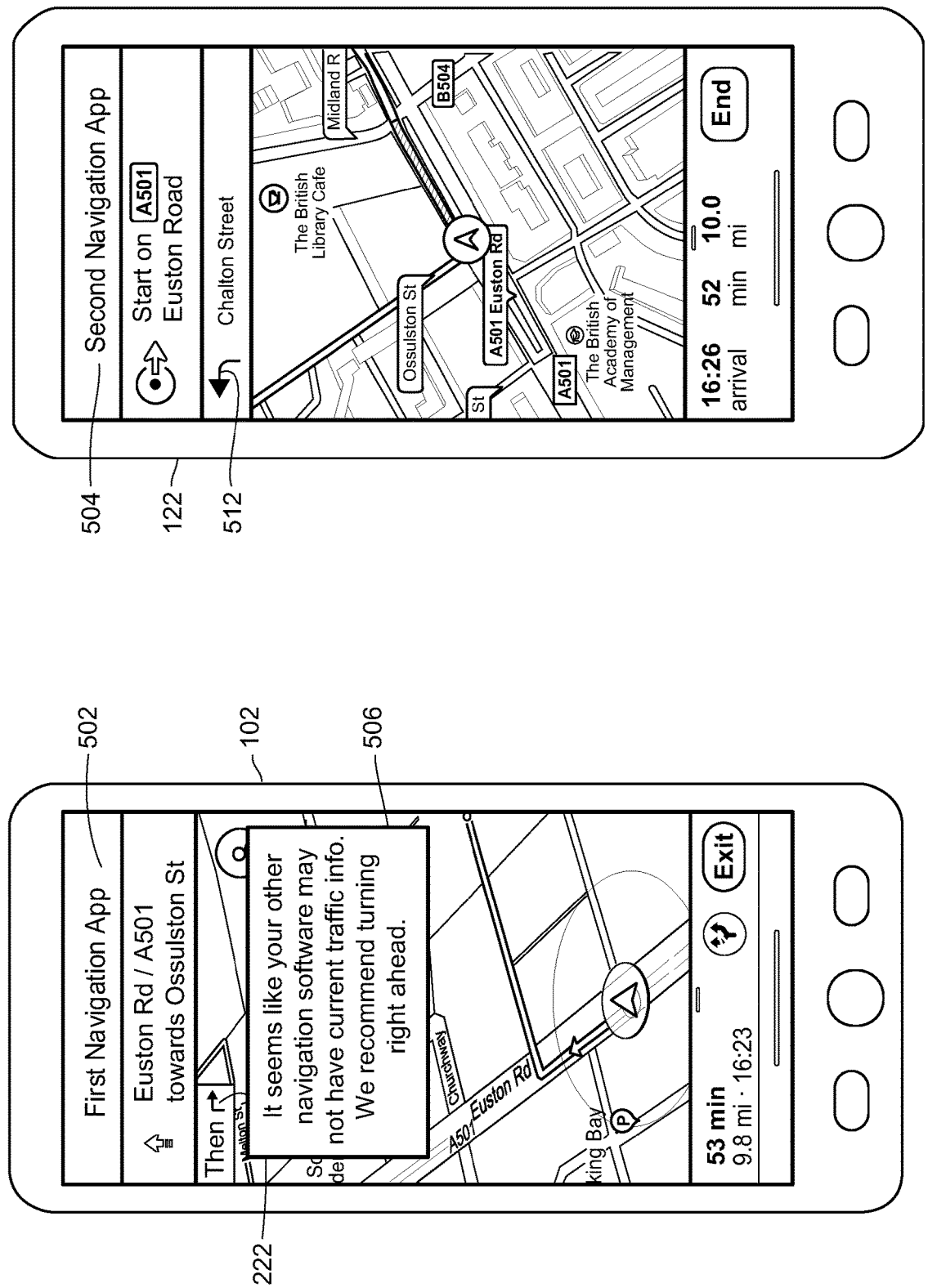
FIGS. 5-6 illustrates example navigation displays of the first computing device providing supplementary navigation instructions to the navigation instructions of the second computing device.
Figure 6:
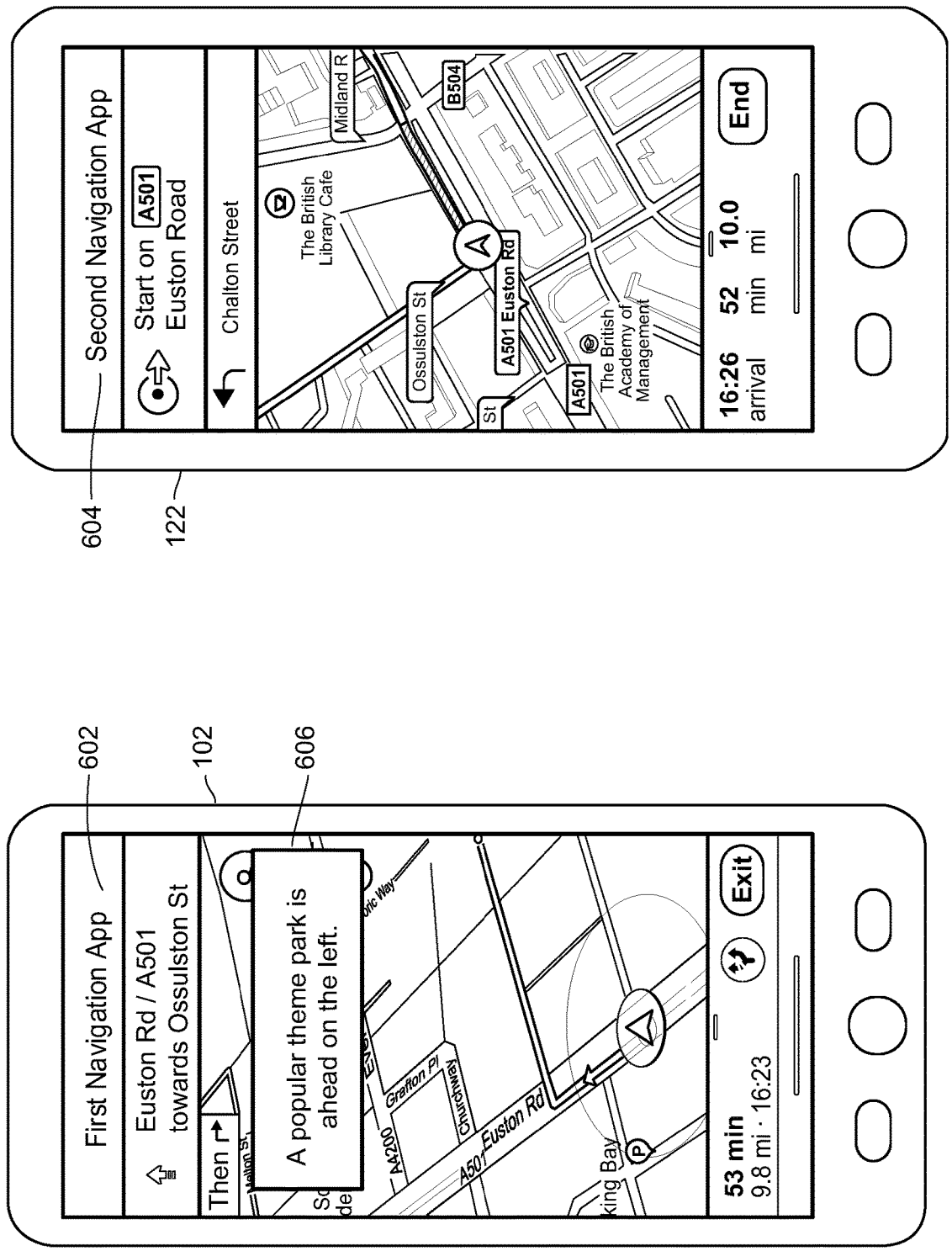

As mentioned above, unlike the scenarios in FIGS. 3-4, in some scenarios, the second device 122 does not interoperate with the first device 102 to provide shared navigation instructions. Turning to FIGS. 5-6, these figures illustrate example navigation displays while the first device 102 is providing supplementary navigation instructions. While implementing the first navigation session, the first device 102 may detect that the second device 122 is in proximity to the first device 102, determine that the second device 122 is implementing a second navigation session, and determine that the second navigation session is for providing a second set of navigation instructions to the same destination as the first navigation session (e.g., via the first communication link 140). As described above, the first device 102 can attempt to communicate with the second device 122 to determine whether the second device 122 is capable of or interested in providing a shared navigation session. Further, additionally or alternatively, the first device 102 can detect the second device 122 by detecting a synthetic voice. The first device 102 can determine, based on detecting the synthetic voice and analyzing the speech of the synthetic voice, that the second computing device is implementing a navigation session. In such implementations, the first device 102 may not attempt to detect the second device via the first communication link 140.

In any event, in FIGS. 5-6, the second device 122 does not adjust its navigation session (e.g., because the second device 122 is not capable of interoperating with the first device 102, or because the first device 102 detects the second device 122 by detecting the synthetic voice and does not send a request to the second device over the first communication link 140). Instead, the second device 122 may continue to present the second set of navigation instructions. The first device 102, however, can adjust the first navigation session to provide instructions that supplement or complement the second set of navigation instructions. In such a scenario, the navigation instructions are improved, while overall processing and power usage of the first and second devices is reduced.

To enable the first device 102 to provide supplementary instructions, the second device 122 may provide the second set of navigation instructions, or route information related to the second route more generally (e.g., traffic data, POI data, etc.), to the first device 102. Even if the second device 122 will not interoperate with the first device 102 to provide a shared navigation session, the second device 122 may still transmit the second set of navigation instructions to the first device 102 (e.g., in response to a request from the first device 102). The second device 122 may send the second set of navigation instructions to the first device 102 via the second communication link 142. The first device 102 can compare the received navigation instructions and/or route information to the first set of navigation instructions and the first route information. If the first route and the second route are different, the first device 102 can provide supplementary instructions. For example, the first device 102 may indicate to the user via audio instructions or displayed instructions that while their other device recommends turning left ahead, the first navigation application 108 recommends turning right. If the received route information does not include information such as POI information or traffic information, then the first device 102 may provide complementary instructions filling in this missing information.

Additionally or alternatively, the second device 122 may indirectly provide the second set of navigation instructions via the synthetic voice emitting the second set of navigation instructions. As mentioned above, the first device 102 can detect that the second device 122 is nearby and implementing a second navigation session by detecting a synthetic voice and analyzing the speech of the synthetic voice. The first device 102 can monitor the audio instructions spoken by the synthetic voice, which correspond to the second set of navigation instructions, and compare the audio instructions to the first set of instructions. If the first route and the second route are different, or if the audio instructions do not include information such as POI information, then the first device 102 can provide supplementary instructions. The supplementary instructions can provide different turn-by-turn navigation directions than the audio instructions spoken by the synthetic voice, or and/or additional route information, such as POI and/or traffic information, not provided by the synthetic voice.

Referring to FIG. 5, for example, the first device 102 can determine that the second set of navigation instructions includes making a maneuver that the first device 102 does not recommend based on current traffic data accessible by the first device 102. The second navigation application 128 displays via a GUI 504 an upcoming maneuver 512 corresponding to a left turn, and emits audio instructing a user to turn left. In contrast, the first navigation application 128 displays via a GUI 502 an upcoming maneuver 522 corresponding to a right turn. In response to the differing directions, the first navigation application 108 can display a prompt 506 (and/or emit corresponding audio instructions) that indicates to the user that the first navigation application 108 recommends a different upcoming maneuver than the second navigation application 128. The first navigation application 108 may determine that the second navigation application 128 may not have access to the quality of traffic data that the first navigation application 108 has access to (e.g., because the second navigation application 128 is recommending a maneuver that encounters more traffic than the first route, or based on traffic information that the second device 122 provides the first device 102). Accordingly, the prompt 506 may include an indication that the user's other navigation application may not have current traffic information.

As another example, referring to FIG. 6, the first device 102 can provide complementary POI information. The first device 102 can determine that the received route information, and/or the audio instructions spoken by the synthetic voice, relating to the second route does not include POI information. Based on the location of the first device 102, the first device 102 can determine nearby traffic, POIs, weather, etc., and can display (and/or emit via a speaker) indications corresponding information to the user. For example, a GUI 602 of the first navigation application 108 can include a prompt 606 indicating that a POI corresponding to a theme park is ahead of the user. The POI information provided by the first device complements the second set of navigation instructions provided by the second navigation application, which displays a GUI 604.

Further, based on a detected synthetic voice, the first device 102 can adjust the first navigation session by adjusting the timing of the audio instructions emitted by the first device 102. In particular, the first device 102 can emit audio instructions corresponding to the supplementary instructions and/or the first of set of navigation instructions at times that do not conflict with when the synthetic voice is speaking. The first device 102 can thus avoid interrupting the second set of navigation instructions.

Example Methods for Providing Navigation Instructions

Figure 7:
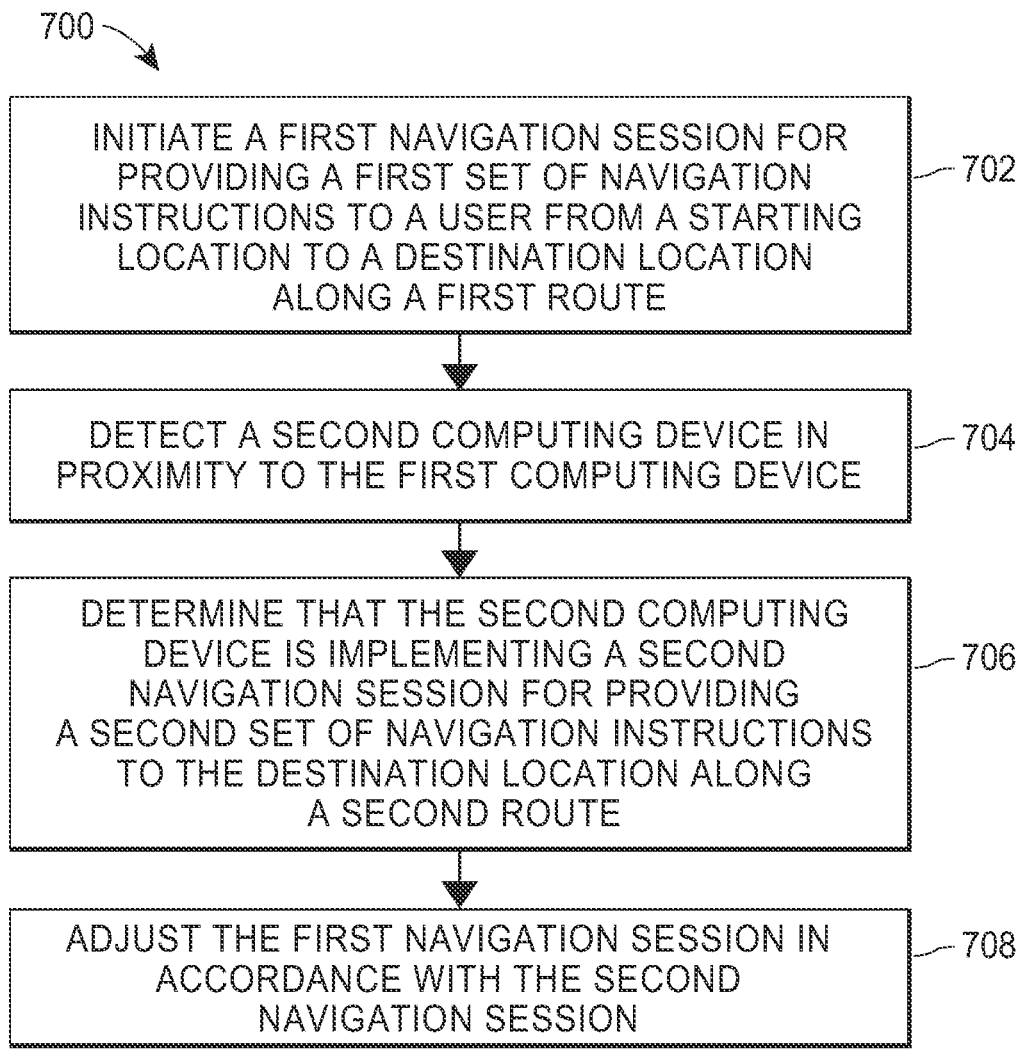
FIG. 7 is a flow diagram for providing navigation instructions, which may be implemented in a computing device, such as the first computing device of FIGS. 1A-6.
Figure 8:
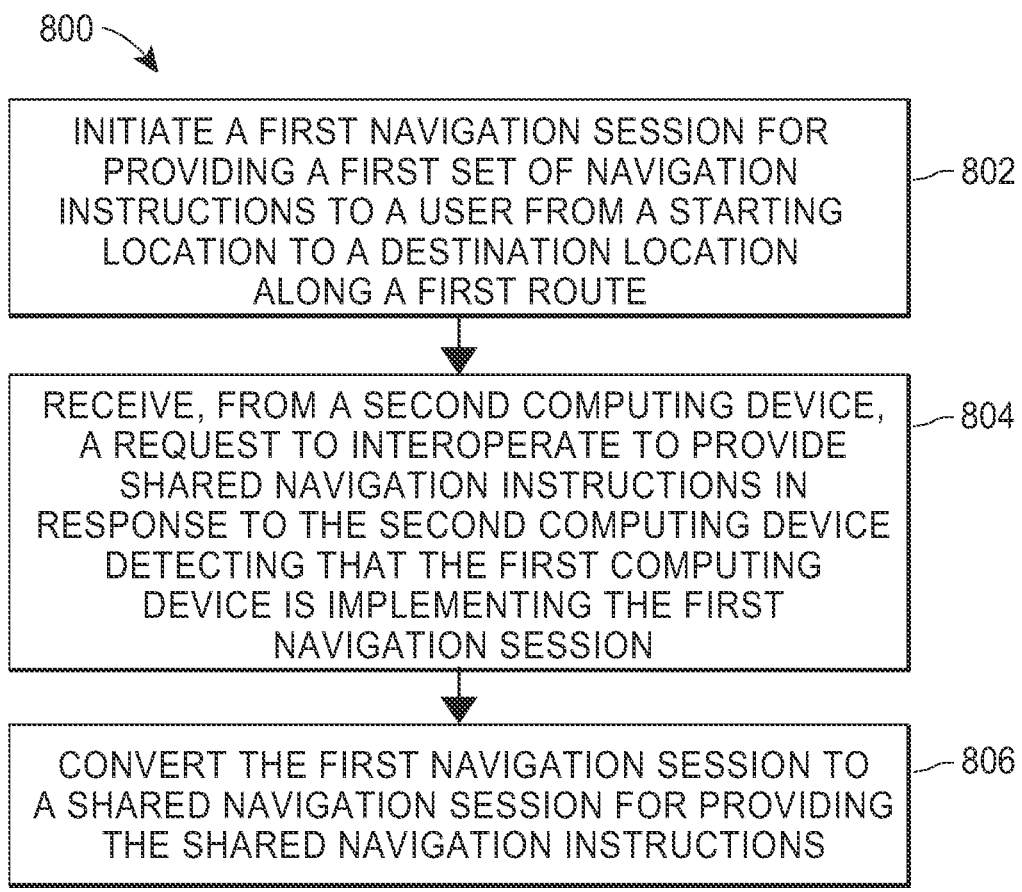
FIG. 8 is a flow diagram for providing navigation instructions, which may be implemented in a computing device, such as the second computing device of FIGS. 1A-6.

FIGS. 7-8 are flow diagrams illustrating example methods for providing navigation instructions in accordance with the techniques of this disclosure.

Turning to FIG. 7, a method 700 can be implemented by a first computing device (e.g., the first device 102). The method 700 can be implemented in a set of instructions stored on a computer-readable memory and executable at one or more processors of the first computing device (e.g., the processor(s) 104).

At block 702, the first computing device initiates a first navigation session for providing a first set of navigation instructions to a user from a starting location to a destination location along a first route. At block 704, the first computing device detects a second computing device (e.g., the second device 122) in proximity to the first computing device. The first and second computing devices may be located within the same vehicle (e.g., the vehicle 172).

Further, at block 706, the first computing device determines that the second computing device is implementing a second navigation session for providing a second set of navigation instructions to the destination along a second route. In response, at block 708, the first computing device adjusts the first navigation session in accordance with the second navigation session.

In some implementations, adjusting the first navigation session may include converting the first navigation session to a shared navigation session, as described with reference to FIGS. 3-4. In other implementations, adjusting the first navigation session may include providing instructions that supplement the second set of navigation instructions, as described with reference to FIGS. 5-6.

Referring now to FIG. 8, a method 800 can be implemented by a first computing device (e.g., the second device 122). The method 800 can be implemented in a set of instructions stored on a computer-readable memory and executable at the one or more processors of the first computing device (e.g., the processor(s) 124).

At block 802, the first computing device initiates a first navigation session for providing a first set of navigation instructions to a user from a starting location to a destination location along a first route. At block 804, the first computing device receives a request to interoperate from a second computing device (e.g., the first device 102). The request can be a request to interoperate to provide shared navigation instructions in response to the second computing device detecting that the first computing device is implementing the first navigation session. Further, at block 806, the first computing device converts the first navigation session to a shared navigation session for providing the shared navigation instructions (e.g., as described with reference to FIGS. 3-4).

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for generating navigation directions through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method in a first computing device for providing navigation instructions, the method comprising:
    initiating, by one or more processors of the first computing device, a first navigation session for providing a first set of navigation instructions to a user from a starting location to a destination location along a first route;
    detecting, by the one or more processors, a second computing device in proximity to the first computing device;
    determining, by the one or more processors, that the second computing device is implementing a second navigation session for providing a second set of navigation instructions to the destination location along a second route; and
    adjusting, by the one or more processors, the first navigation session in accordance with the second navigation session, wherein adjusting the first navigation session includes converting the first navigation session to a shared navigation session, such that the first and second navigation sessions become one shared navigation session presenting the same turn-by-turn directions.

2. The method of claim 1, wherein adjusting the first navigation session includes:
    communicating with the second computing device to exchange first route information relating to the first route and second route information relating to the second route, the first route information including the first set of navigation instructions and the second route information including the second set of navigation instructions;
    generating shared navigation instructions based on the first route information and the second route information; and
    determining a manner in which to provide the shared navigation instructions to the user; and
    the method further comprises providing the shared navigation instructions to the user in the determined manner.

3. The method of claim 2, further comprising:
    transmitting, by the one or more processors to the second computing device, a request to interoperate with the first computing device in order to provide the shared navigation session;
    receiving, by the one or more processors from the second computing device, an affirmative response to the request; and
    adjusting the first navigation session in response to the affirmative response.

4. The method of claim 2, wherein generating the shared navigation instructions includes selecting the first set of navigation instructions as the shared navigation instructions in response to determining that the first set of navigation instructions and the second set of navigation instructions are identical.

5. The method of claim 2, wherein generating the shared navigation instructions includes selecting the first set of navigation instructions or the second set of navigation instructions as the shared navigation instructions based on which of the first set of navigation instructions or the second set of navigation instructions has an earlier estimated time of arrival at the destination.

6. The method of claim 2, wherein generating the shared navigation instructions includes:
    selecting an individual navigation instruction from the first set of navigation instructions or the second set of navigation instructions to include in the shared navigation instructions based on characteristics of the first and second sets of navigation instructions.

7. The method of claim 6, wherein determining the manner in which to provide the shared navigation instructions includes:
    determining that the first computing device is to provide first audio instructions for navigation instructions determined based on the first route information; and
    determining that the second computing device is to provide second audio instructions for navigation instructions determined based on the second route information.

8. The method of claim 2, wherein determining the manner in which to provide the shared navigation instructions includes:
    selecting a primary device from the first computing device or the second computing device to provide audio instructions corresponding to the shared navigation instructions.

9. The method of claim 2, wherein:
the second computing device is detected and second set of navigation instructions is determined via a first communication link; and
communicating with the second computing device to exchange first route information relating to the first route and second route information relating to the second route is performed via a second communication link different from the first communication link.

10. The method of claim 9, wherein the first communication link has a lower bandwidth than the second communication link.

11. The method of claim 1, wherein the method further comprises receiving the second set of navigation instructions from the second computing device; and
wherein adjusting the first navigation session includes:
comparing, by the one or more processors, the second set of navigation instructions to the first set of navigation instructions; and
in response to determining that the second set of instructions differ from the first set of navigation instructions, providing supplementary instructions via at least one of a display or a speaker of the first computing device.

12. The method of claim 11, wherein detecting the second computing device includes:
monitoring ambient noise for a synthetic voice; and
detecting the second computing device by detecting the synthetic voice.

13. A first computing device for providing navigation instructions, the first computing device comprising:
one or more processors; and
a non-transitory computer-readable medium coupled to the one or more processors and storing instructions thereon that, when executed by the one or more processors, cause the first computing device to:
initiate a first navigation session for providing a first set of navigation instructions to a user from a starting location to a destination location along a first route;
detect a second computing device in proximity to the first computing device;
determine that the second computing device is implementing a second navigation session for providing a second set of navigation instructions to the destination location along a second route; and
adjust the first navigation session in accordance with the second navigation session by converting the first navigation session to a shared navigation session, such that the first and second navigation sessions become one shared navigation session presenting the same turn-by-turn directions.

14. The first computing device of claim 13, wherein the instructions cause the first computing device to adjust the first navigation session by:
communicating with the second computing device to exchange first route information relating to the first route and second route information relating to the second route, the first route information including the first set of navigation instructions and the second route information including the second set of navigation instructions;
generating shared navigation instructions based on the first route information and the second route information; and
determining a manner in which to provide the shared navigation instructions to the user; and wherein the instructions further cause the first computing device to provide the shared navigation instructions to the user in the determined manner.

15. The first computing device of claim 14, wherein the instructions cause the first computing device to generate the shared navigation instructions by:
selecting an individual navigation instruction from the first set of navigation instructions or the second set of navigation instructions to include in the shared navigation instructions based on characteristics of the first and second sets of navigation instructions.

16. The first computing device of claim 13, wherein the instructions cause the first computing device to detect the second computing device by:
monitoring ambient noise for a synthetic voice; and
detecting the second computing device by detecting the synthetic voice;
wherein the instructions further cause the first computing device to receive the second set of navigation instructions from the second computing device; and
wherein the instructions cause the first computing device to adjust the first navigation session by:
comparing the second set of navigation instructions to the first set of navigation instructions; and
in response to determining that the second set of instructions differ from the first set of navigation instructions, providing supplementary instructions via at least one of a display or a speaker of the first computing device.

17. A method in a first computing device for providing navigation instructions, the method comprising:
initiating, by one or more processors of the first computing device, a first navigation session for providing a first set of navigation instructions to a user from a starting location to a destination location along a first route;
receiving, by the one or more processors from a second computing device implementing a second navigation session, a request to interoperate to provide shared navigation instructions in response to the second computing device detecting that the first computing device is implementing the first navigation session; and
converting, by the one or more processors in response to the request, the first navigation session to a shared navigation session for providing the shared navigation instructions, such that the first and second navigation sessions become one shared navigation session presenting the same turn-by-turn directions.

18. The method of claim 17, wherein converting the first navigation session includes:
communicating with the second computing device to exchange first route information relating to the first route and second route information relating to a second route determined by the second computing device, the first route information including the first set of navigation instructions and the second route information including a second set of navigation instructions to the destination location along the second route;
receiving, from the second computing device, the shared navigation instructions generated based on the first route information and the second route information;
receiving, from the second computing device, an indication of a manner in which to provide the shared navigation instructions to the user; and
the method further comprises providing the shared navigation instructions to the user in the indicated manner.

19. The method of claim 18, wherein providing the shared navigation instructions in the indicated manner includes providing audio instructions corresponding to individual navigation instructions of the shared navigation instructions, generated based on the first route information.

20. The method of claim 18, wherein providing the shared navigation instructions in the indicated manner includes displaying the shared navigation instructions without providing audio instructions describing the shared navigation instructions.

\* \* \* \* \*